United States Patent [19]

Miller et al.

[11] Patent Number: 4,680,759
[45] Date of Patent: Jul. 14, 1987

[54] STANDARD/PROPORTIONAL MULTIPLEXER

[75] Inventors: Larry J. Miller, South Jordan; Clifford T. Johnson, Sandy; Glen D. Rattlingourd, Salt Lake City, all of Utah

[73] Assignee: Sperry Corporation, Blue Bell, Pa.

[21] Appl. No.: 660,742

[22] Filed: Oct. 15, 1984

[51] Int. Cl.$^4$ .......................... H04J 3/04; H04J 3/22
[52] U.S. Cl. ..................................... 370/112; 370/84; 370/92
[58] Field of Search ...................... 370/58, 79, 82–84, 370/112, 118, 92

[56] References Cited

U.S. PATENT DOCUMENTS

| | | | |
|---|---|---|---|
| 4,093,823 | 6/1978 | Chu | 370/92 |
| 4,409,683 | 10/1983 | Woodward | 370/112 |
| 4,488,293 | 12/1984 | Haussmann et al. | 370/84 |

FOREIGN PATENT DOCUMENTS 0117896  7/1984  Japan ................................ 370/112

Primary Examiner—Douglas W. Olms
Assistant Examiner—Curtis Kuntz
Attorney, Agent, or Firm—G. Donald Weber, Jr.; Glenn W. Bowen

[57] ABSTRACT

A multiplexer system which operates as a standard multiplexer as well as a proportional multiplexer by providing typical multiplexing operation by one circuit portion and proportional multiplexing operation by other portions of the circuit wherein the multiplexer system can interface with a plurality of users or user devices in such a way that data streams between the user devices and the multiplexer system can be reallocated so as to enhance data transfer irrespective of the clock-to-data relationship such that no data is lost during circuit operation. The proportional MUX can be selectively controlled by a microprocessor.

15 Claims, 3 Drawing Figures

STANDARD/PROPORTIONAL MULTIPLEXER

GOVERNMENT CONTRACT RIGHTS

This invention was made with Government support under contract no. F33657-81-C-1184 awarded by the U.S. Air Force. The U.S. Government has certain rights in this invention.

BACKGROUND

1. Field of the Invention

This invention is directed to a multiplexer circuit, in general, and to a standard/proportional multiplexer circuit, in particular, especially such a circuit which can be implemented as a single monolithic integrated circuit using gate array implementation.

2. Prior Art

There are many types of multiplexer (MUX) circuits known in the art. These circuit, typically, receive inputs from a plurality of sources and, selectively, supply output signals to a single user (or vice versa). Among the types of MUXs available are standard MUXs which operate as pure switching circuits and proportional MUXs which permit greater control over the information transferred thereby.

Essentially, MUXs are an array of SPST switches, connected to function in the nature of a single-pole, multi-position switch. Typically, these use 2, 4, 8, 16 (or other) number of channels. The MUX's can be of analog or digital configuration. In the case of analog devices, especially in integrated circuit (IC) form, a digital decoder is used so that only a binary input is required to select the desired switch position. When used as a commutator, the binary input must change at the commutation rate. Differential MUX's usually use an array of DPST switches associated with two outputs thereby permitting direct connection to the differential amplifier inputs.

Multiplexers usually operate with relatively fast binary pulse signals and find application in data acquisition systems telemetry, industrial controls, programmable power supplies and many other electronic circuits and systems.

The principles of time division multiplexing can be implemented into any digital system by using MUXs, typically, in IC form. This circuitry is especially useful in data routing, parallel-to-serial conversions, signal gating and a host of other applications including those using Boolean algebra. A standard MUX will perform time division multiplexing of the data stream with the user rates.

A proportional MUX is used whenever the amount of data allocated to a user can be dynamically changed. This change can be effected under microprocessor control and can occur from minute-to-minute, hour-to-hour, or whatever the needs are. Thus, as a user's needs increase, more of the data stream can be supplied thereto and thereby reduce the storage that the user otherwise would have to have to avoid losing of data in the event that the user did not have this capability. In some cases, users are arranged to pass information for a period of time and then, in essence, do nothing for a while. In this case, a proportional MUX is used to pass data for a period of time, then allocate nothing until the user needs to have more information transmitted. With this concept of a proportional MUX, a microprocessor will monitor the user's need and allocate the proportion of data stream required to meet that need. The microprocessor could then modify the allocated proportion as the requirements arose so that the user could have more or less of that data stream. This permits a continually expanding and contracting type of operation with each of the users.

A related concept is called a statistical MUX. Statistical MUXs can perform a similar function under microprocessor control, except the microprocessor totally controls the data. In these systems, the microprocessor frames the data and it is presented at a low enough rate so the microprocessor has total control thereof. However, microprocessor control of the data on a bit-for-bit basis is relatively slow and cannot be used adequately in high speed applications. One thing that is required on any proportional multiplexing scheme is there has to be information as to what portion of the data stream has been allocated to each user. The microprocessor usually provides that information in the header portion of each data frame. The data frame allocation information may be straight binary bits or it may be more elaborate such as an error correction code (similar to Golay or Hamming) which can detect and correct single errors or detect multiple errors. This helps eliminate false decoding of the proportional data at the demultiplexing end.

SUMMARY OF THE INSTANT INVENTION

The instant circuit includes a standard multiplexer which can multiplex a plurality of users. Some of the users may be replaced with one high rate user through an automatic phase adjuster circuit (APA). The APA samples data such that receipt of data (even at data transition edges) is proper irrespective of the clock-to-data relationship at the multiplexer portion of the circuit. This standard MUX portion of the circuit issues bursted clocks to the user and receives data from the user in response to the received clock. Also, synchronization bits can be selectively inserted into the data stream to identify the MUX frame of the data. The output data stream can be transmitted "clear" or modulo-two added to a pseudo-random bit stream (PRBS) to ensure data transitions at the multiplexer's output.

The circuit also includes a proportional multiplexer which has the ability to change the number of bits assigned to each MUX channel by the microprocessor. Also, the proportional MUX can be selectively reallocated by the microprocessor. This will occur such that no data will be lost during this transition.

DESCRIPTION OF THE PRFERRED EMBODIMENT

Figure 1:
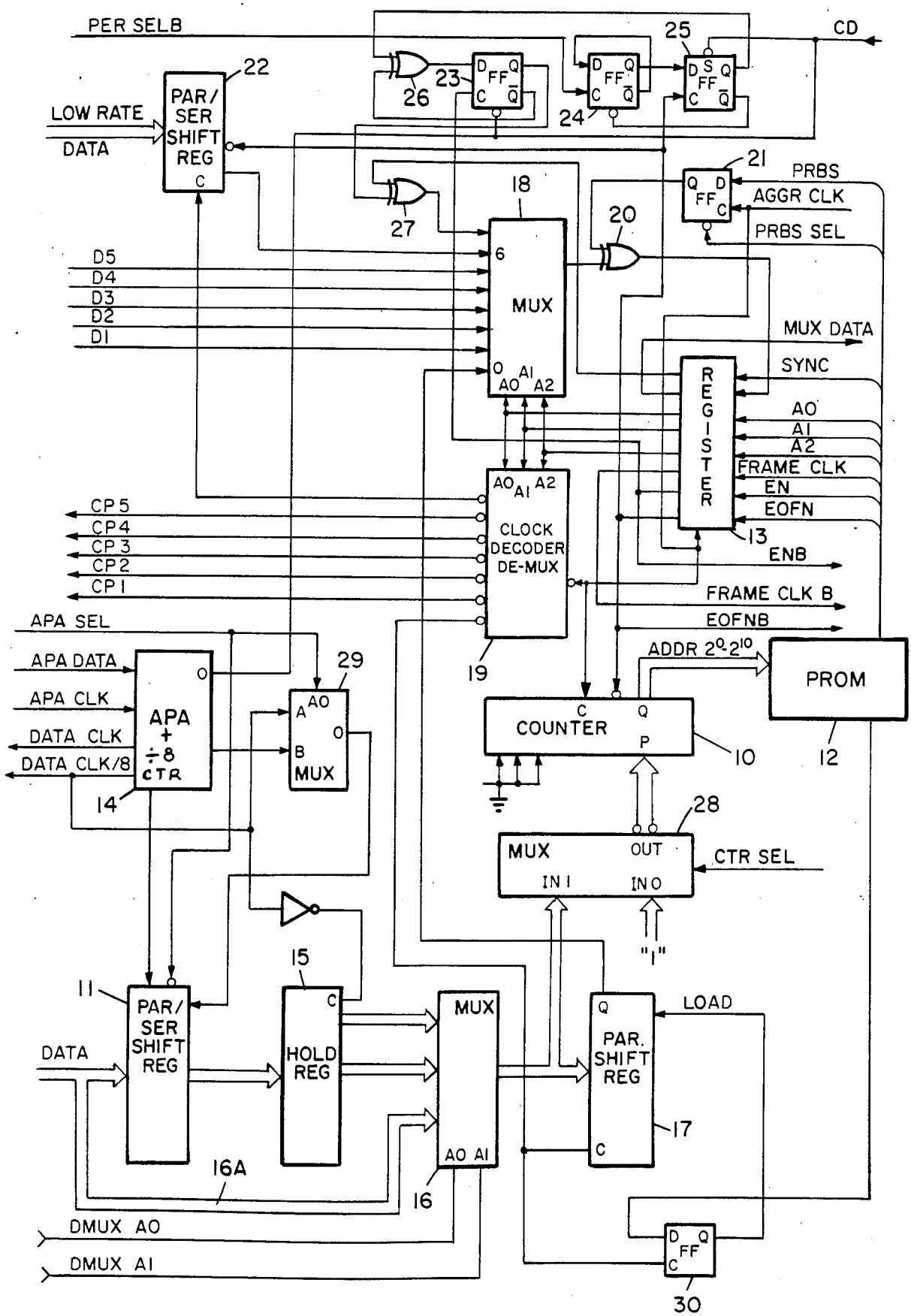
FIG. 1 is a block diagram of the "standard" multiplexer of the instant invention.

Referring now to FIG. 1, thre is shown a block diagram of a standard MUX. In this context "standard MUX" does not mean a prior art circuit. Rather, it means a circuit that operates as a general purpose multiplexer but, in this case, with an external PROM 12 controlling it. Counter 10, in this embodiment an 11-bit counter, to address PROM 12. The information stored in the PROM 12 is supplied to seven of the 8-bit inputs of register 13 plus the load to flip-flop 30 the, PRBS and PRBS SEL to flip-flop 21 which controls the operation of the "standard MUX". The PROM 12 feeds a low on line EOFN through register 13 and resets the counter 10 once every frame thereby creating a servo-loop-type circuit between the counter 10 and the PROM 12. The counter 10 is reset to a zero condition every time the EOFN signal from PROM 12 goes to a low level. Prom 12 outputs A0, A1 and A2 are decoded by MUX 18 and DEMUX 19 to select which data bits are to pass through the MUX 18 and which user clock is to be generated by DEMUX 19. Since 3-bits (A0, A1 and A2) can be decoded into 8 different states, MUX 18 is an 8 to 1 MUX and DEMUX 19 is a one-of-eight decoder. PROM 12 output SYNC is used to generate the frame syncsignal. This sync may be output in a block form of distributed throughout the frame. Depending on the state of flip-flop 23 the sync bits from the PROM may be inverted or not through Exclusive-OR gate 27. PROM 12 output EN is used to control the state of flip-flop 23 by being the clock to this flip-flop. PROM 12 output FRAME CLK is present if a clock is desired at the frequency of the frame rate. PROM 12 outputs PRBS and PRBS SEL are used to control flip-flop 21. PRBS will consist of a pseudorandom bit stream contained in PROM 12. If PRBS SEL is high, PRBS will be clocked into flip-flop 21 and Exclusive-OR added to the MUX data by Exclusive OR gate 20. If PRBS SEL is low, flip-flop 21 will be reset and the MUX data will pass through Exclusive OR gate 20 unchanged. PROM 12 output LOAD is buffered through flip-flop 30 and is used to load the 8-bit parallel-to-serial shift register 17, as required.

A unique property of this MUX is that a serial or a parallel data stream can be supplied to the 0 input of MUX 18. The serial or parallel data stream is loaded into the 8-bit parallel or serial shift register 11. In parallel operation, the system loads in 8-bits at one time. In serial operation, the data is passed through at a higher rate (typically 8 times faster). In this case, the data is entered through an APA 14. This APA (automatic phase adjuster) is, typically, digital with a divide-by-8 counter therein and can be of the type similar to those described in U.S. Pat. No. 4,208,724 by G. D. Rattlingourd or of the type described in a copending application by Miller et al, entitled HIGH RATE MULTIPLEXER, bearing Ser. No. 646,015, filed on Aug. 31, 1984 and assigned to the common assignee. In the parallel mode of operation, the divide-by-8 counter is used. Thus, the clock to the parallel-serial-shift-register 11 is the output of either the APA in the serial mode of operation or the divide-by-8 counter in the parallel mode of operation. The two-to-one MUX 29 is used to select the parallel mode of operation clock or the serial mode of operation clock.

Thus, the data is loaded either serially or in parallel and loads up to 8 bits. That data is then shifted into a holding register 15 (or buffer register) while the next 8 bits are being loaded into register 11. The data at register 15 is passed through a MUX 16 so that it can be placed into another 8-bit parallel-to-serial shift register 17 which is similar to register 11. This operation permits the data to be entered in virtually any fashion, i.e. serial, right-side up, upside down, or the like. This permits substantial freedom in the loading and networking operations. In this embodiment, MUX 16 is a 3:1 multiplexer that has the ability of passing the data straight through from buffer register 15 to the 8-bit parallel-to-serial register 17, tipping the data upside down so that the most significant bit (MSB) of buffer register 15 is loaded into the least significant bit (LSB) of shift register 17, or it loads the input data into register 17. Alternatively, this operation allows loading the input directly into register 17, via MUX 16, by using the direct path 16A thus bypassing the operations of registers 11 and 15.

The data loaded into shift register 17 may be any number of bits from 0 up to 8. The purpose of this part is to add flexibility into the multiplexer. It is obvious that however many bits of data are loaded into register 17, they all will occur at the same frequency in the MUX frame. In other words, if up to eight users will require the same frequency of data into the MUX, they would share this common port through shift register 17. They would also share a common clock allocated to each of them. Under PROM 12 control, the LOAD signal is generated through flip-flop 30 to allow new data to be entered into shift register 17. PROM 12 also controls the A0, A1 and A2 inputs which allows MUX 18 port 0 to be selected for multiplexing shift register 17 data into the main MUX frame. INPUTS A0, A1 and A2 also control the 1 of 8 clock decoder 19 which provides the clocks to shift register 17 to serially shift the data out into the MUX main stream.

MUX 18 is used to multiplex the various data into one aggregate data stream. The output of MUX 18 is passed to Exclusive OR gate 20. The Exclusive OR gate 20 is used, if selected, to permit a pseudo-random bit stream (PRBS) to be inserted and Exclusive OR added to the data stream. The insertion of the PRBS signal is selectively controlled by flip-flop 21. That is, when the PRBS SEL signal is high, flip-flop 21 is activated which allows the PRBS signal to pass therethrough. Otherwise, when flip-flop 21 is inactive, the Exclusive OR gate merely passes the data stream therethrough. The PRBS SEL signal is supplied by PROM 12. The output of Exclusive OR gate 20 is passed to one of the flip-flops of 8-input register 13. Register 13 realigns the MUX data stream to the aggregate clock prior to transmission from the MUX as MUX DATA.

In addition, five input ports supply signals D1-D5 to the MUX 18. These are inputs from the outside world users and are supplied in relation to the clock signals CP1-CP5 which are generated to the user by the 1 of 8 clock decoder 19. Thus, there is provided user data to the MUX in response to receiver user clocks. MUX 18 input 6 is the relatively low speed input wherein a plurality of input bits are supplied to the parallel to serial shift register 22. While 8-bits are, typically, any number of these bits can be used. The bits are loaded into register 22 on a once-a-frame basis (EOFN from PROM 12) and they are transmitted through the MUX 18 into the aggregate MUX DATA frame on a once-a-frame basis. These bits can be put into the data stream wherever desired, but they can only be put out one bit at a time. Thus, if the frame rate is 50 KHz, the data coming in has to be exactly 50 KHz. Since up to 8 bits may be stored in shift register 22 and they may be output at any time during the frame generation, the clocks generated by port 6 of decoder 19 cannot be used to clock the user data into shift register 22. This is why Frame clock is generated from PROM 12 and deglitched through shift register 13 so the low rate users will have a clock signal. This is desirable in that up to 8 low rate DATA users can be inserted while the MUX data is being framed without using additional system input ports, and the attendant circuitry, e.g. increased PROM and PROM controls MUX ports and clock decoding ports. This circuitry permits the low rate data to be loaded into shift register 22 during the end of frame time. Then, during the actual frame time itself, the low rate data is already loaded and ready for use and is put into the aggregate MUX DATA stream whenever necessary during the generation of the frame.

Flip-flops 23, 24 and 25, along with Exclusive OR gates 26 and 27 comprise the sync generating circuitry. SYNC information is loaded from PROM 12 through input register 13 to one input of Exclusive OR gate 27. Flip-flop 23 is used to invert the sync bits through Exclusive OR gate 27 if it is set or not invert them if flip-flop 23 is reset. Flip-flop 23 will change state each time it is clocked by EN from PROM 12 through input register 13 if flip-flop 25 is reset. In normal operation the sync bits are alternated every other frame to make lock up easier at the far end. However, in the case of the standard MUX and the proportional MUX (described infra) operating in conjunction with each other, it becomes necessary to know when the proportional MUX is re-allocating its user data. To mark this happening, the sync code is not permitted to alternate from one frame to the next. This is accomplished by the PER SEL B line being pulsed low and back high which sets flip-flop 24. The state of flip-flop 24 is sampled by flip-flop 25 at the EOFN signal from PROM 12. If flip-flop 24 was set, then flip-flop 25 wil set and clear flip-flop 24. Flip-flop 25 also goes to Exclusive OR gate 26. As long as flip-flop 25 is reset, the not $\bar{Q}$ of flip-flop 23 passes through Exclusive OR gate 26 unchanged making flip-flop 23 a toggle flip-flop. However, if flip-flop 25 is set, it will invert flip-flop 23 $\bar{Q}$ not forcing flip-flop 23 to remain unchanged for the next clock pulse. Thus, every time PER SEL B is present, two frames of MUX DATA will be transmitted with the identical sync codes indicating that the proportional MUX has re-allocated its user data.

MUX 28 is used to load the counter 10 with external data for test purposes only. During normal operation, CTR SEL is always low which enables the ones on its INO input to be inverted and output to the parallel input lines P of counter 10. Thus every time the EOFN pulse occurs from PROM 12, the counter 10 will reset to zero and start over.

Figure 2:
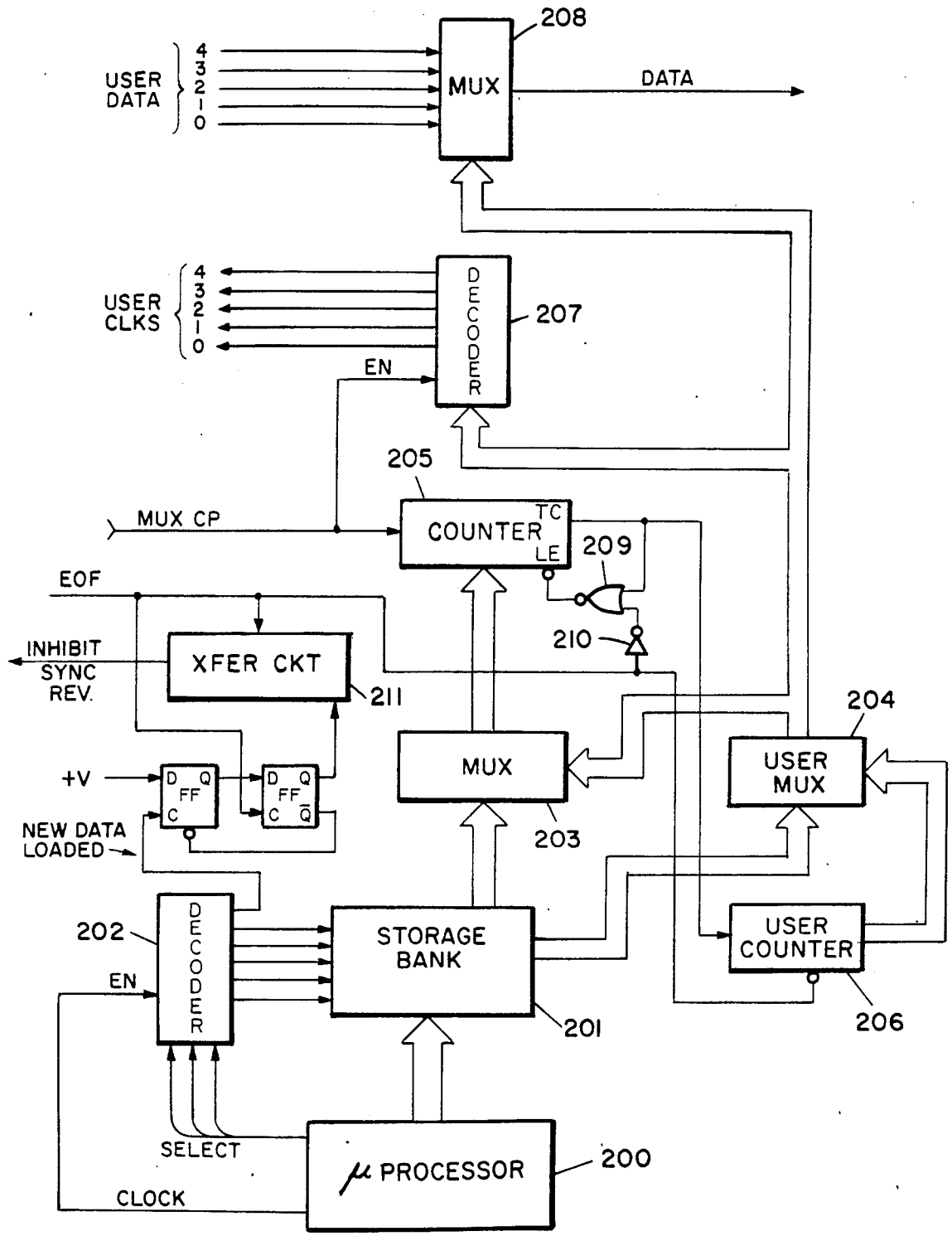
FIG. 2 is a block diagram of one embodiment of the proportional multiplexer of the instant invention.
Figure 3:
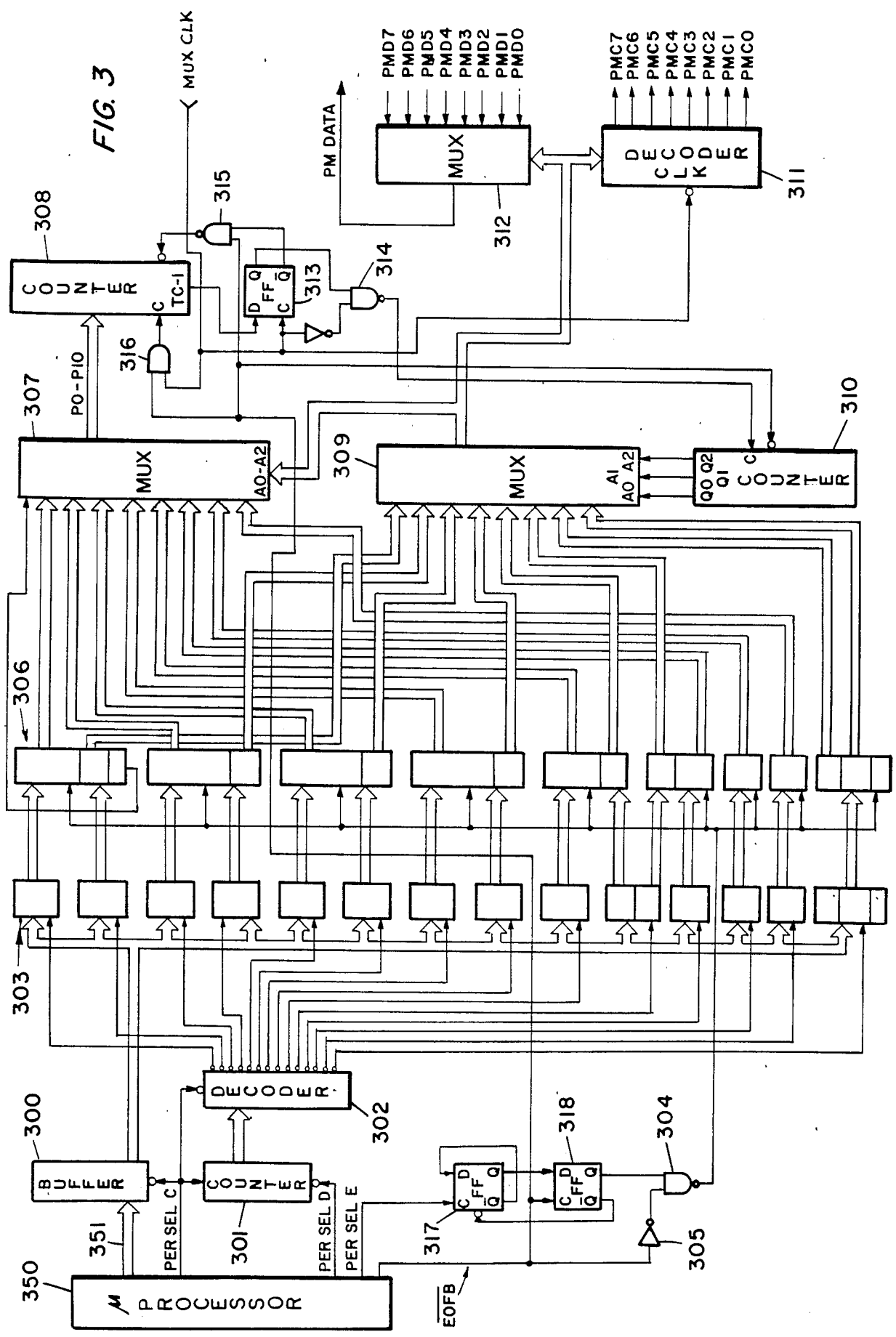
FIG. 3 is a block diagram of another embodiment of the proportional multiplexer of the instant invention.

Referring now to FIGS. 2 and 3, there are shown separate embodiments of proportional multiplexers. Broadly, the proportional MUX is used when the rate at which the information goes into the frame from a user and the number of bits allocated to that user is to be dynamically changed. In the embodiment shown in FIG. 2, a microprocessor 200 interfaces with a storage bank 201 which can be a huge storage bank. In one embodiment, a storage bank comprising 10×14 flip-flops is used to store the information coming from the microprocessor. The microprocessor select lines and the clock lines are supplied to a decoder 202 so that as the 8-bits come from the microprocessor, the storage bank is sequentially loaded.

The microprocessor 200 has a very slot interface relative to a proportional MUX. Therefore, all of the information is loaded into the storage bank 201 and then the microprocessor produces a synchronization time to indicate when the change is to occur. In response to the synchronization signal, all of the bits that are in the storage bank are transferred to a usable bank within the storage bank 201. Typically, the storage bank includes the microprocessor interface bank and the usable bank. The usable bank uses this data to address 5:1 multiplexer 203 which, in turn, addresses 11 stage counter 205. By addressing the counter 205, MUX 203 preloads a count number into the counter, for each one of these banks. This count number determines how long the counter will count for any one user before it switches to the next user. Each time the counter reaches the final count for a given user, the TC terminal of counter 205 will produce a signal whereby the load terminal LE of counter 205 will be enabled through gate 209 to preload the count number for the next user. The signal at terminal TC will also increment user counter 206 for the next user signal. A 5:1 MUX 203 is used in this embodiment because five users are shown. The 5:1 MUX addresses the counter 205 with regard to how many bits each one of the users have and for each one of the users.

In addition, the usable bank of storage bank 201 addresses the user MUX 204 which is also a 5 input MUX. The user counter 206 also supplies signals to MUX 204. Thus, under microprocessor control, the system can take user 0, 1, 2, 3, or 4 in any combination or order desired so that there are, effectively, 32 combinations of signals and output order. Thus, the user MUX 204 allows selection of which user is first, which one is second, which one is third, which one is fourth and which one is fifth. These orders can be changed under microprocessor control every time that the storage bank is over written with new information. If a user drops out totally, it can be allocated at the end. Inasmuch as the end is never reached because $\overline{EOF}$ occurs prior to that time and resets counters 205 and 206, the system continues to operate with the four users, three users, two users, or whatever number of users are active.

The inhibit sync reversal signal from transfer circuit 211 indicates that the system is at the end of frame and the user data has been re-allocated. This signal can be supplied to PER SEL B in the standard MUX (of FIG. 1) to inhibit the sync reversal. This condition indicates that the system has shifted information fromthe microprocessor bank into the active memory bank 201 and a new re-allocation has occurred. Decoder 207 enables the clocks to the selected user so the user can supply data back to MUX 208 in response to the received clock signal. The data received from the user is muliplexed into a composite data stream through MUX 208. The data out of MUX 208 is supplied to one of the standard MUX ports (D1, D2, D3, D4 or D5) where it is inserted into the aggregate standard MUX data stream. The MUX CP is generated from the corresponding standard MUX port (CP1, CP2, CP3, CP4 or CP5) to which the data is input.

Referring now to FIG. 3, there is another embodiment of the proportional multiplexer. An 8-bit buffer 300 is connected to the microprocessor 350 by means of the microprocessor bus 351. The microprocessor also can clear the counter 301 via application of the PER SEL D signal and increment the count in counter 301 via application of signal PER SEL C. As the counter 301 counts, it will be decoded at the 1:14 decoder 302 and load the 8-bits out of the microprocessor buffer 300 into one of the rank of internal storage buffers 303. When the microprocessor has completed loading buffer 303 with 14 words of new information, it will produce a low pulse PER SEL E. The low pulse PER SEL E will cause flip-flop 317 to set. Flip-flop 317 will remain set until the end of the next $\overline{EOFB}$ pulse which will cause flip-flop 318 to set. Flip-flop 318 setting will clear flip-flop 317 and also enable NAND gate 304. The next $\overline{EOFB}$ pulse will be inverted through 305 and cause the output of NAND 304 to pulse low. This action will cause the information in storage buffers 303 to be transferred to the operational storage buffers 306. At the conclusion of this transmission, the end of frame condition ($\overline{EOFB}$) will clear flip-flop 318 thereby disabling NAND gate 304. The only time data is transferred from the temporary storage (buffers 303) register to the operational storage register (buffers 306) is at the end of frame time so there will be no ambiguities as to what information is being transmitted at any given time. At the same time data is transferred into the operational storage resister, the microprocessor 350 produces per sel B to the standard MUX which inhibits sync from alernating for the next data frame. This alerts the receiving station that the user data in the proportional MUX has been re-allocated.

The information loaded into operational buffer 306 contains two types of intelligence. One is how much of the proportional MUX has been allocated to each of the eight users and the other is what order will the users be inserted into the data frame. MUX 307 selects the amount of data for each user to be loaded into counter 308. This information is loaded as a two's complement number, so that the counter will count from a preloaded value up to terminal count (TC). It will be noted that to save logic, users one through four have eleven lines to preload the counter. Thus, these users may use up to 2048 bits each of the proportional MUX frame, while users 5 through 8 have only 8 lines or up to 256 bits each of the proportional MUX frame. Mux 309 selects the order in which the users will be serviced in the proportional MUX frame. The three bits from MUX 309 select the count complement to be loaded into counter 308, selects which user data port on MUX 312 will be allowed to pass data, and also selects which clock port will be selected to pass clocks to the user. Counter 310 is cleared by each $\overline{EOFB}$ pulse so that it starts over from zero at each end of frame time. Once counter 310 has been reset, it will increment one count each time counter 308 reaches terminal count. Thus, a new user is selected and processed after the present one has been served by counter 308. If $\overline{EOFB}$ is reached before a user or number of users have been addressed, they are inactive or not used in the proportional MUX data. Thus, the microprocessor 350 controls unused users by placing them last which allows $\overline{EOFB}$ to occur prior to these users being serviced.

Counter 308 receives its complementary count inputs from MUX 307. It also receives a parallel load command from $\overline{EOFB}$ through AND gate 315. Since this counter is a synchronous load counter, $\overline{EOFB}$ causes a clock through AND gate 316 to ensure that the counter preloads the first user count. When counter 308 arrives at terminal count minus 1 (TC−1), flip-flop 313 will set for one clock period, i.e. at the same time counter 308 reaches terminal count. Flip-flop 313 acts as a pipe-line flip-flop to speed up the action of terminal count of counter 308. Flip-flop 313 setting enables NAND gate 314 so the next low MUX clock will increment counter 310. This addresses the next MUX 309 location which in turn selects the next user to be serviced by the proportional MUX.

The 8:1 MUX 312 is used to pass the data selected by MUX 309 through to its output as PM DATA. This proportional MUX data is passed to the standard MUX where it is multiplexed into the aggregate MUX data stream. The one of eight decoder 311 passes the MUX clock (PMCX) out to the selected user. In response to that clock, the user synchronizes its data changse back into the 8:1 MUX 312.

Thus, there is shown an improved multiplexer system which is capable of operating in both the standard and the proportional modes. Thus, data can be allocated to respective users in the usual multiplexing fashion as well as on a dynamically changing rate. In the preferred embodiment described herein, specific circuit arrangements and combinations are shown and suggested. These elements provide one operative system. However, those skilled in the art may conceive of variations to these particulars and modifications to the specific circuits and circuit components. Any such variations or modifications which fall within the scope of this description are intended to be included therein as well. This description is intended to be illustrative only and is not intended to be limitative. The scope of the invention is limited only by the claims appended hereto.

We claim:

1. A multiplexer system comprising, control means, register means connected to receive and store signals from said control means, counter means connected to receive signals from said register means and to supply address signals to said control means thereby to select the signal produced by said control means, user data signal supplying means for supplying data signals from user means, multiplexer means connected to said register means to receive coded signals therefrom in order to select which data signals are passed through said multiplexer means from said user data signal supplying means, clock signal supplying means, demultiplexer means connected to said register means to receive said coded signals in order to select which clock signals are generated by said demultiplexer means, data supply means connected to supply further data signals to said multiplexer means, first shift register means for operating on said further data signals in parallel or serial fashion and supplying said further data signals to said multiplexer means, and data handling means for operating upon said further data signals to supply said further data signals to said first shift register means directly or in inverse sequence.

2. The system recited in claim 1 including, pseudo-random signal generators means connected to selectively add a pseudo-random signal to the data signals which are passed through said multiplexer means.

3. The system recited in claim 1 wherein, said data handling means includes second shift register means for operating on said further data signals in parallel or serial fashion, holding register means for receiving and holding the signals produced by said second shift register means as a result of the operating on said further data signals, and second multiplexer means connected to receive said further data signals directly and to receive the signals stored in said holding register means and to selectively supply signals representative of said further data signals to said first shift register means.

4. The system recited in claim 1 wherein, said control means is connected to said first shift register means to control the loading of said further data signals into said first shift register means.

5. The system recited in claim 1 including,
low rate data supplying means connected to said multiplexer means to selectively supply low rate data signals thereto.

6. The system recited in claim 1 including,
synchronizer means connected to said multiplexer means to control the operation of said multiplexer in response to a sync signal from said control means.

7. The system recited in claim 1 wherein,
said control means comprises a programmable memory system (PROM).

8. The system recited in claim 1 wherein,
said data supply means includes phase adjustor means which permits high speed serial data input to said multiplexer means.

9. The system recited in claim 1 wherein,
said data supply means includes divider means for converting the input data to a parallel mode of operation.

10. The system recited in claim 3 wherein,
said first and second shift register means in said data supply means includes a parallel to serial converter register for receiving data input signals and converting said data input signals from parallel to serial format.

11. The system recited in claim 1 wherein,
said control means supplies a frame signal to said counter means via said register means to reset said counter means on a periodic basis.

12. A multiplexer system comprising,
control means,
said control means comprises a microprocessor,
counter means,
decoder means connected between said microprocessor and said storage means whereby said control means can sequentially load said storage means,
counter means,
multiplexer means connected to said control means to selectively supply a preset count signal to said counter means from said control means,
user selection means connected to receive user selection signals from said control means and to supply a selector signal to said multiplexer means thereby to establish which preset count signal is supplied to said counter means by said control means,
said user selection means includes user multiplexer means connected to receive control signals from said control means,
counter control means for selectively enabling said counter means to receive a new present count signal from said control means and to change the status of said user selection means,
said counter control means includes logic circuitry connected between a terminal count output terminal of said counter means and a count enable input terminal of said counter means,
said counter control means further includes user counter means for receiving signals from said counter means and supplying control signals to said user multiplexer means,
decoder means connected to said user selection means to decode said selector signals and to supply clock signals to a selected user, and
data multiplexer means connected to said user selection means to receive said selector signals thereby to select which user data bits are passed through said data multiplexer means.

13. A multiplexer system comprising,
control means,
storage means connected to receive information signals from said control means in accordance with control signals supplied by said control means,
said storage means comprises a temporary storage register connected to receive signals from said control means and an operational storage register connected to receive signals from said temporary storage register in response to a control signal from said control means,
counter means,
user control circuitry,
multiplexer means for selectively transmitting information signals from said storage means to said counter means and to said user control circuitry for determining which user data shall be used thereby and which user clock pulses will be generated thereby,
said multiplexer means comprises first and second multiplexer means connected to receive signals from said temporary storage register, and
frame counter means connected to receive control signals from said control means and from said counter means and to supply selector signals to control the operation of said multiplexer means.

14. The system recited in claim 13 wherein,
said storage means comprises buffer register circuit means.

15. The system recited in claim 13 wherein,
said multiplexer means further includes,
data multiplexer means for selectively passing data signals therethrough, and
clock decoder means for selectively generating clock signals,
wherein each of said data multiplexer means, said clock decoder means and said first multiplexer means connected to receive output signals produced by said second multiplexer means.

* * * * *

UNITED STATES PATENT AND TRADEMARK OFFICE
CERTIFICATE OF CORRECTION

PATENT NO. : 4,680,759
DATED : July 14, 1987
INVENTOR(S) : Larry J. Miller, Clifford T. Johnson, Glen D. Ratlingourd It is certified that error appears in the above—identified patent and that said Letters Patent are hereby corrected as shown below:

Column 3, line 15, "of" should be -- or -- .

Column 5, line 29, "not" should be deleted.

Column 5, line 32, "not" should be deleted.

Column 7, line 17, "buffer" should be -- buffers -- .

Signed and Sealed this

Fifteenth Day of December, 1987

Attest:

DONALD J. QUIGG

*Attesting Officer*   *Commissioner of Patents and Trademarks*